US010122909B2

(12) United States Patent
Hu et al.

(10) Patent No.: US 10,122,909 B2
(45) Date of Patent: Nov. 6, 2018

(54) AUTO-FOCUS APPARATUS AND METHOD

(71) Applicant: Beijing Spreadtrum Hi-Tech Communications Technology Co., Ltd., Beijing (CN)

(72) Inventors: Yi Hu, Shanghai (CN); Hao Wang, Shanghai (CN); Wei Wang, Shanghai (CN)

(73) Assignee: BEIJING SPREADTRUM HI-TECH COMMUNICATIONS TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 14/958,591

(22) Filed: Dec. 3, 2015

(65) Prior Publication Data

US 2016/0191785 A1    Jun. 30, 2016

(30) Foreign Application Priority Data

Dec. 25, 2014  (CN) .......................... 2014 1 0827420

(51) Int. Cl.
H04N 5/232      (2006.01)
(52) U.S. Cl.
CPC ............................. *H04N 5/23212* (2013.01)
(58) Field of Classification Search
None
See application file for complete search history.

(56) References Cited

U.S. PATENT DOCUMENTS

| 5,475,429 | A | * | 12/1995 | Kodama | ............ | H04N 5/23212 |
| | | | | | | 348/350 |
| 5,572,011 | A | * | 11/1996 | Goto | ........................ | G02B 7/32 |
| | | | | | | 250/201.2 |
| 2008/0002048 | A1 | | 1/2008 | Ito et al. | | |
| 2008/0012977 | A1 | | 1/2008 | Ito et al. | | |

(Continued)

FOREIGN PATENT DOCUMENTS

| CN | 101098405 A | 1/2008 |
| CN | 102708564 A | 10/2012 |
| JP | 2009260724 A | 11/2009 |

OTHER PUBLICATIONS

Office Action dated Sep. 30, 2017, in Chinese Patent Application No. CN 201410827420.7.

*Primary Examiner* — Timothy J Henn
(74) *Attorney, Agent, or Firm* — Vierra Magen Marcus LLP

(57) ABSTRACT

An auto-focus apparatus and an auto-focus method are provided. The auto-focus apparatus includes: a lens, a lens driving component, and a focus control module; wherein the lens is configured to guide light transmitted from a target object; wherein the lens driving component is configured to drive the lens to move to the multiple positions to obtain the original images, and drive the lens to a focusing position obtained by the focus control module; and wherein the focus control module is configured to obtain frequency respond results each of which corresponds to interested pixels in one of the original images, calculate a desired frequency respond result based on the obtained frequency respond results and take a first position of the lens corresponding to the desired frequency respond result as the focusing position. Accordingly, focus accuracy and focus speed under conditions of poor contrast texture and weak light are improved.

13 Claims, 6 Drawing Sheets

(56) References Cited

U.S. PATENT DOCUMENTS

| | | | |
|---|---|---|---|
| 2008/0131109 A1 | 6/2008 | Honjo et al. | |
| 2009/0047010 A1* | 2/2009 | Yoshida | G02B 7/36 |
| | | | 396/127 |
| 2009/0262234 A1 | 10/2009 | Kondo et al. | |
| 2013/0010179 A1* | 1/2013 | Takahara | G02B 7/36 |
| | | | 348/353 |
| 2016/0014359 A1* | 1/2016 | Ota | H04N 5/3696 |
| | | | 348/223.1 |
| 2016/0295107 A1* | 10/2016 | Kinoshita | H04N 5/23212 |

* cited by examiner a2 a3

AUTO-FOCUS APPARATUS AND METHOD

CROSS-REFERENCE TO RELATED APPLICATIONS

The present application claims priority to Chinese patent application No. 201410827420.7, filed on Dec. 25, 2014, and entitled "AUTO-FOCUS APPARATUS AND METHOD", the entire disclosure of which is incorporated herein by reference.

TECHNICAL FIELD

The present disclosure generally relates to imaging field, and more particularly, to an auto-focus apparatus and an auto-focus method.

BACKGROUND

Usually, a piece of photographic equipment, such as a camera, a cell phone configured with a photographing function, etc., is able to implement auto-focusing.

Auto-focusing is achieved by utilization of light reflection. Specifically, light reflected by a target object (i.e. an object being photographed) is caught by an imaging sensor (such as, a CCD sensor, a CMOS sensor, etc.) of the photographic equipment. Information corresponding to the reflected light is further processed by a computer for actuating a power focus apparatus, so as to achieve auto-focusing.

Generally, an auto-focus apparatus may include: at least one imaging lens, at least one focusing lens, at least one photosensitive component, and at least one focal-length adjusting mechanism.

According to their basic principles, auto-focus methods are divided into two categories: active auto-focus method and passive auto-focus method. Active auto-focus method achieves auto-focusing by measuring a distance between the lens and the target object. Passive auto-focus method achieves auto-focusing by detecting the definition of an image on a focusing screen.

Specifically, when the active auto-focus method is used for achieving auto-focusing, the photographic equipment is generally configured with an infrared generator (or an ultrasound generator). Infrared light (or ultrasonic sound wave) generated by the infrared generator (or the ultrasound generator) reaches the target object and is reflected by the target object. The reflected infrared light (or the reflected ultrasonic sound wave) is captured by a receiver in the photographic equipment, and thus auto-focusing is achieved based on the received light (or sound wave). Optical principle employed by the active auto-focus method is similar to that of a triangulation method, based on which the distance between the lens and the target object is calculated. The active auto-focus method may be employed by low-grade cameras (e.g. various eye-level finders) for implementing auto-focusing.

However, the active auto-focus method has following disadvantages.

On one hand, the infrared light from the infrared generator or the ultrasonic sound wave from the ultrasound generator may be reflected by the target object towards various directions, or may not reach the target object, that means limited amount of reflected infrared light or reflected ultrasonic sound wave can be captured by the receiver. Especially when the target object has a slanted surface or a smooth surface, auto-focusing performance of the photographic equipment may be degraded. Further, when the target object has high brightness and is far away from the photographic equipment, it may be difficult to achieve auto-focusing.

On the other hand, as the photographic equipment is configured to actively send light (e.g. infrared light) to the target object, low contrast between the light actively sent and light received may exist. Thus, it may be hard to achieve auto-focusing when the ambient light is weak. When the target object is in narrow strip form or in motion, light may be absorbed by the target object. Furthermore, when the target object is behind a piece of glass, the light should penetrate through the glass before reaching the target object. Accordingly, the light may be reflected by the glass, and focusing on the target object may be hard to achieve.

Regarding the passive auto-focus method, auto-focusing is implemented by receiving and analyzing ambient light reflected by the target object.

In comparison with the active auto-focus method, the passive auto-focus method possesses following advantages. On one hand, there is no need to have an emitting system (e.g. infrared generator, ultrasound generator, etc.) in the photographic device, thus both power consumption and size thereof may be reduced. Therefore, the passive auto-focus method can be used in small handheld devices, such as a cell phone, etc. On the other hand, even when the target object has high brightness, or the target object is in backlight, far away from the photographic equipment, or behind a piece of glass, etc., ideal focusing performance can be achieved.

However, the passive auto-focus method has following disadvantages. Firstly, when the target object is in narrow strip form and has weak texture, false focusing is easy to occur and focusing time is long. Secondly, under circumstance of low contrast and weak ambient light, focusing performance is also poor. Thirdly, when the target object is in motion, includes polarized light, has black color, or has a mirror surface, etc., it is hard to achieve auto-focusing.

Accordingly, neither existing auto-focus apparatuses nor existing auto-focus methods can achieve good focusing performance, thus imaging performance of the photographic equipment configured with the existing auto-focus apparatus is degraded.

SUMMARY

One object of the present disclosure is to improve focusing accuracy when photographing an object with poor texture contrast and under condition of weak ambient light.

According to one embodiment of the present disclosure, an auto-focus apparatus is provided. The auto-focus apparatus includes: a lens, a lens driving component, and a focus control module; wherein the lens is configured to guide light transmitted from a target object, where original images are formed based on the light guided by the lens at multiple positions, respectively; wherein the lens driving component is configured to drive the lens to move to multiple positions to obtain multiple original images, and drive the lens to a focusing position obtained by the focus control module; and wherein the focus control module is configured to obtain frequency respond results each of which corresponds to interested pixels in one of the original images, calculate a desired frequency respond result based on the obtained frequency respond results and take a first position of the lens corresponding to the desired frequency respond result as the focusing position.

In some embodiments, the frequency respond result is obtained based on frequency respond values of the interested pixels in the corresponding original image.

In some embodiments, the frequency respond result is a sum of the frequency respond values of the interested pixels in the corresponding original image.

In some embodiments, the frequency respond result is a mean value of the frequency respond values of the interested pixels in the corresponding original image.

In some embodiments, the focus control module includes a filter unit, and the filter unit is configured to obtain the frequency respond values of the interested pixels according to Equation (1):

$$H(z) = \frac{b_1 + b_2 z^{-1} + \ldots + b_{m+1} z^{-m}}{a_1 + a_2 z^{-1} + \ldots + a_{n+1} z^{-n}} \quad \text{Equation (1)}$$

wherein, H(z) represents the frequency respond value of one of the interested pixels, z represents image data of the corresponding interested pixel, m and n represent order numbers of the filter unit, $a_1$ to $a_{n+1}$ and $b_1$ to $b_{m+1}$ represent adjustable parameters of the filter unit and are determined based on historical original images obtained in previous focusing processing. The historical original images represent original images which were obtained in previous focusing processes. For each of the historical original images, whether it has a good focusing effect or not is already known. The image data may be pixel value of the interested pixel, which does not tend to limit the scope of the present disclosure.

In some embodiments, the filter unit is a forth-order filter.

In some embodiments, the adjustable parameters are determined based on frequency respond curves generated based on multiple historical original images, and the historical original images include at least an image corresponding to an accurate focusing position and an image corresponding to an inaccurate focusing position.

In some embodiments, the adjustable parameters are determined by: determining a pass-band frequency and a stop-band frequency of the filter unit based on the frequency respond curves, and generating the adjustable parameters based on the pass-band frequency and the stop-band frequency.

In some embodiments, the filter unit is a band-pass filter or a high-pass filter.

In some embodiments, the focus control module includes a statistic unit, wherein the statistic unit is configured to output the frequency respond results based on the frequency respond values of the interested pixels in the original images.

In some embodiments, the auto-focus apparatus includes a focusing-position search module; wherein the focusing-position search module is configured to: establish a correlation between frequency respond results and lens positions based on the frequency respond results and the corresponding positions of the lens obtained during the lens is driven to move, and identify the desired frequency respond result based on the correlation.

In some embodiments, the focusing-position search module is integrated in the focus control module.

In some embodiments, the auto-focus apparatus further includes an image sensing module; wherein the image sensing module is configured to: receive the light transmitted from the target object and guided by the lens, and generate an image signal based on the light received, where the original image is generated based on the image signal.

In some embodiments, the image sensing module is a C-MOS sensor which also serves as a photographic component.

According to one embodiment of the present disclosure, an auto-focus method for a piece of photographic equipment with a lens is provided. The method includes: driving the lens to move to multiple positions to obtain multiple original images, where the original image is generated based on light transmitted from a target object and guided by the lens at the corresponding position; obtaining frequency respond results, where each of the frequency results corresponds to interested pixels in one of the original images; calculating a desired frequency respond result based on the obtained frequency respond results and taking a first position of the lens corresponding to the desired frequency respond result as a focusing position; and driving the lens to the focusing position.

In some embodiments, the frequency respond result is obtained based on frequency respond values of the interested pixels in the corresponding original image.

In some embodiments, the frequency respond result is a sum of the frequency respond values of the interested pixels in the corresponding original image.

In some embodiments, the frequency respond result is a mean value of the frequency respond values of the interested pixels in the corresponding original image.

In some embodiments, obtaining the frequency respond result based on the frequency respond values of the interested pixels includes: obtaining the frequency respond values according to Equation (1):

$$H(z) = \frac{b_1 + b_2 z^{-1} + \ldots + b_{m+1} z^{-m}}{a_1 + a_2 z^{-1} + \ldots + a_{n+1} z^{-n}} \quad \text{Equation (1)}$$

wherein, H(z) represents the frequency respond value of one of the interested pixels, z represents image data of the corresponding interested pixel, m and n represent order numbers of the filter unit, $a_1$ to $a_{n+1}$ and $b_1$ to $b_{m+1}$ represent adjustable parameters of the filter unit and relate to historical original images obtained in previous focusing processing. The historical original images represent original images which were obtained in previous focusing processes. For each of the historical original images, whether it has a good focusing effect or not is already known. The image data may be pixel value of the interested pixel, which does not tend to limit the scope of the present disclosure.

In some embodiments, the adjustable parameters are determined based on frequency respond curves generated based on the historical original images, the historical original images include at least an image corresponding to an accurate focusing position and an image corresponding to an inaccurate focusing position; and wherein the adjustable parameters are generated based on a pass-band frequency and a stop-band frequency of the filter unit which are generated according to the frequency respond curves.

In some embodiments, the filter unit is a band-pass filter or a high-pass filter.

In some embodiments, calculating the desired frequency respond result based on the obtained frequency respond results includes: establishing a correlation between frequency respond results and lens positions based on the frequency respond results and the corresponding positions of the lens obtained during the lens is driven to move; and identifying the desired frequency respond result based on the correlation.

The present disclosure has following advantages.

Firstly, the present disclosure provides an auto-focus apparatus, and the focus control module therein is different from existing focus control modules in focusing mechanism. Specifically, in the present disclosure, a frequency respond result of interested pixels in an original image is used as focusing statistics. The frequency respond result can be used for selecting an effective frequency band, where the effective frequency band indicates a focusing accuracy. Furthermore, through driving the lens to diffident positions, multiple original images are obtained. Based on frequency respond results corresponding to these multiple original images, a desired frequency respond result is selected, thus a first lens position corresponding to the desired frequency respond result is taken as a focusing position. According, an accurate auto-focusing is achieved by moving the lens to the focusing position.

Accordingly, the focusing statistic information (i.e. the frequency respond results) used in the auto-focusing process implemented by the auto-focus apparatus of the present disclosure is more stable. Specifically, image data are processed from aspect of frequency domain, which are less likely to be influenced by factors such as ambient light, etc. Further, the focus control module in the auto-focus apparatus is adapted to filter image noise and extract precise focus statistic data. Accordingly, focusing performance is improved.

Secondly, through the auto-focus method provided by the present disclosure, both the focusing speed and the focusing accuracy under condition of low ambient light level are improved. Further, problems existed in prior art, such as unable to achieve focusing, long in time for focusing, etc., when the target object has weak feature, are solved.

Thirdly, in some embodiments of the present disclosure, the focus control module is embodied as a filter unit. Adjustable parameters of the filter unit can be flexibly adjusted according to focusing performances indicated by historical original images. As such, various pass band functions (band-pass or high pass) are achieved without changing a structure of the filter unit. Accordingly, the filter unit is adapted to implement different filtering processes to the original images. Frequency respond results favorable for correcting focus accuracy can be generated according to the focusing performances indicated by the historical original images. Therefore, a better image noise reduction effect and more effective image frequency information are obtained.

As parameters of the focus control module (i.e. the filter unit) are adapted to be adjusted flexibly, focusing accuracy can be improved when photographing an object with weak texture. Further, image dithering, caused by failing of the lenses gathering to a focusing position quickly, is reduced as well. The lenses can gather to the focusing position quickly during the entire focus process, thus time spent by the entire auto-focusing process is significant reduced.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 1:
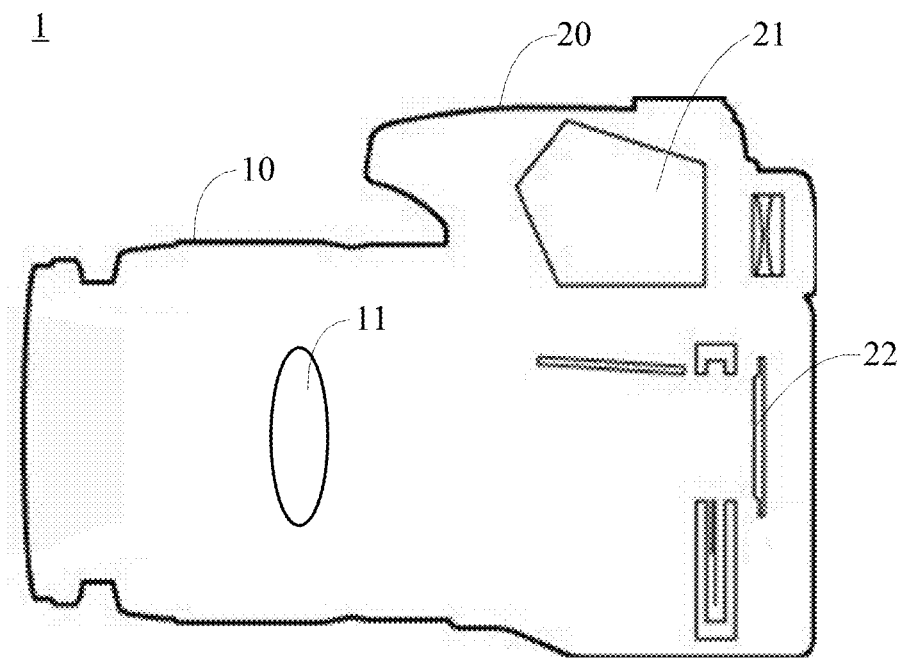
FIG. 1 schematically illustrates a structure of a piece of photographic equipment according to one embodiment of the present disclosure.

Referring to FIG. 1, a piece of photographic equipment according to one embodiment of the present disclosure is illustrated. The photographic equipment may be a camera module of a cell phone or a camera. The photographic equipment includes a lens system 10 and a main apparatus 20. The main apparatus 20 is configured to obtain image data of a target object based on light guided by the lens system 10.

Figure 2:
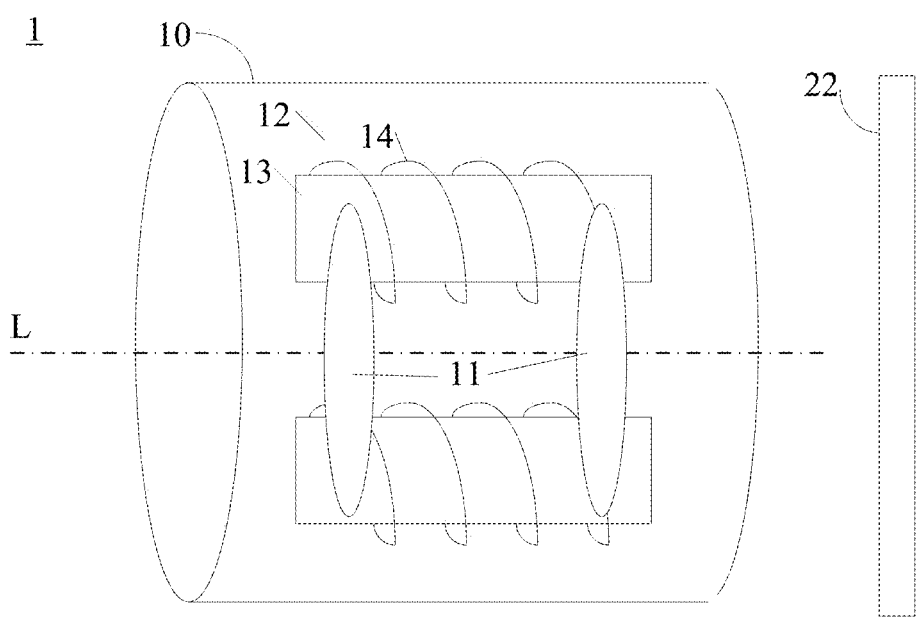
FIG. 2 schematically illustrates structures of a lens system and a main apparatus of a piece of photographic equipment according to one embodiment of the present disclosure.

In combination with referring to FIG. 2, the lens system 10 includes a lens unit 11 and a lens driving component 12, wherein the lens unit 11 includes a plurality of photographic lenses which are set along an optical axis L. The plurality of photographic lenses includes a lens for achieving focus (hereafter referred to as focusing lens for short). The lens driving component 12 includes a voice coil 13 and a spring 14. The voice coil 13 is configured to be driven by a focusing signal (e.g. a focusing voltage or a focusing current) to rotate. The rotation of the voice coil 13 drives the photographic lenses in the lens system 11 to move along the optical axis L, thus changing physical positions of the photographic lenses. Accordingly, through cooperation of the voice coil 13 and the spring 14, the physical positions of the photographic lenses can be precisely controlled by the focusing signal. In some embodiments of the present disclosure, only the physical position of the focusing lens is changed.

Keeping referring to FIG. 1 and FIG. 2, the main apparatus 20 includes a LVF (Live View Finder) 21 and an imaging sensor 22 (e.g. a C-MOS sensor). Light transmitted from the target object can be guided to the imaging sensor 22 via the lens unit 11 of the lens system 10, thus obtaining an original image signal of the target object. Further, an original image can be generated based on the original image signal obtained by the imaging sensor 22, where the original image is used for recording and achieving auto-focusing.

Figure 3:
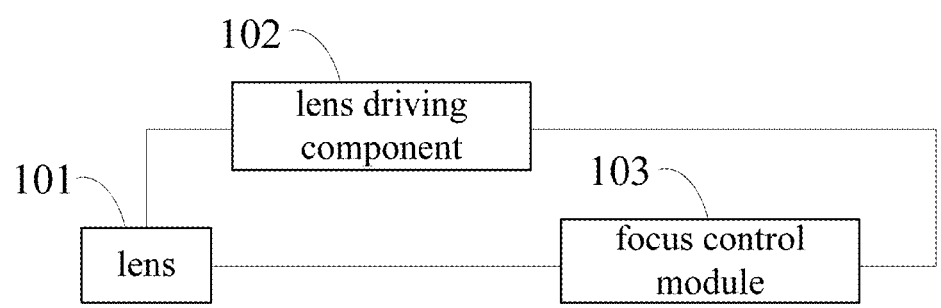
FIG. 3 schematically illustrates a structure of an auto-focus apparatus according to one embodiment of the present disclosure.

Referring to FIG. 3, an auto-focus apparatus a1 according to one embodiment of the present disclosure is illustrated. The auto-focus apparatus a1 is adapted to be applied by a piece of photographic equipment (which may have a similar structure with the photographic equipment 1 as recited above) for achieving auto-focusing. The auto-focus apparatus a1 includes: a lens 101, a lens driving component 102, and a focus control module 103.

The lens 101 is configured in a lens system (i.e. the lens system 10). The lens 101 may refer to multiple lenses configured along an optical axis of the photographic equipment a1. The lens 101 includes a lens for achieving auto-focusing, which is referred to as a focusing lens. The focusing lens is adapted to move along the optical axis. The focusing lens is driven by the lens driving component 102 to move based on a signal relating to focus result (i.e. a focusing signal). Thus a position of the focusing lens is changed. The position of the focusing lens can be detected via a lens position detecting component, for driving the focusing lens move again. The lens position detecting component is mounted in or out of the auto-focus apparatus. Light transmitted from the target object is guided by the lens 101, thus generating an original image.

Keep referring to FIG. 3, the focus control module 103 is configured to obtain a frequency respond result of interested pixels in the original image.

The focus control module 103 is configured to: select effective frequency band information of image data (e.g. pixel value) of the interested pixels in the original image from aspect of frequency domain; and filter image noise caused under conditions of poor texture and weak light, thus outputting image information of the effective frequency band.

In some embodiments, the interested pixels may be selected randomly. In some embodiments, the interested pixels may be selected based on predetermined collective regions of pixels (e.g. region of interest).

In some embodiments, the frequency respond result may be obtained by the focus control module 103 through following processes: calculating frequency respond values of the original image, where the frequency respond value indicates an amplitude spectrum of the original image on the frequency domain; and outputting the frequency respond result according to frequency respond values corresponding to the interested pixels in the original image. Further, an effective frequency band may be selected based on a pass-band feature of the focus control module 103 (which may be embodied as a filter), and a frequency respond value corresponding to the effective frequency band is further obtained, thus removing image noise.

In some embodiments, the frequency respond result is an evaluation value of the focusing performance. In other words, the frequency respond result indicates whether the original image generated is in a good focusing performance at the corresponding position of the lens 101 and whether the focusing accuracy is acceptable.

Accordingly, the frequency respond result is obtained based on whether frequency respond values of the interested pixels in the original image meet an acceptable focusing accuracy requirement at the corresponding position of the lens 101. Therefore, in the present disclosure, the frequency respond result is only required being able to indicate a condition of the frequency respond values of the interested pixels in the original image, and a specific calculation relation between the frequency respond result and the frequency respond values is not limited. In some embodiments, the frequency respond result may be a sum of the frequency respond values of the interested pixels in the corresponding original image. In some embodiments, the frequency respond result may be a mean value of the frequency respond values of the interested pixels in the corresponding original image.

It should be noted that, the frequency respond result should be the only result corresponding to the frequency respond values, no matter the frequency respond result is a sum or a mean value of the frequency respond values of the interested pixels. In other words, the calculation relation between the frequency respond result and the frequency respond values is not limited by the present disclosure, as along as the frequency respond result is the only result obtained based on the calculation relation and the frequency respond values of the interested pixels in the corresponding original image.

In some embodiments, the frequency respond values of the interested pixels are directly obtained, rather than obtained by: calculating the frequency respond values of pixels in the original image, and selecting the frequency respond values corresponding to the interested pixels, as recited above. Specifically, the frequency respond result can be obtained by the focus control module 103 through following processes: calculating frequency respond values of interested pixels in the original image, wherein the frequency respond values indicate an amplitude spectrum of the interested pixels on a frequency domain, and outputting a frequency respond result based on the frequency respond values of the interested pixels in the original image. Further, an effective band of the interested pixels may be obtained based on a pass-band feature of the focus control module 103 (which may be embodied as a filter), and the frequency respond values in the effective frequency band is obtained, thus removing image noise.

In some embodiments, a filter unit is configured in the focus control module 103 to obtain the frequency respond values of the interested pixels as recited above. The filter unit is configured to process the original image or image data of the interested pixels according to Equation (1), for obtaining the frequency respond values corresponding to the image data of the pixels in the original image:

$$H(z) = \frac{b_1 + b_2 z^{-1} + \ldots + b_{m+1} z^{-m}}{a_1 + a_2 z^{-1} + \ldots + a_{n+1} z^{-n}} \qquad \text{Equation (1)}$$

wherein, $H(z)$ represents the frequency respond value of one of the pixels, $z$ represents image data of the corresponding interested pixel, $m$ and $n$ represent order numbers of the filter unit, $a_1$ to $a_{n+1}$ and $b_1$ to $b_{m+1}$ represent adjustable parameters of the filter unit obtained in previous focusing processing. The historical original images represent original images which were obtained in previous focusing processes. For each of the historical original images, whether it has a good focusing effect or not is already known. The image data may be pixel value of the interested pixel, which does not tend to limit the scope of the present disclosure.

In some embodiments, the filter unit is an IIR (Infinite Impulse Response) filter including a dual biquad filter. In other words, the filter unit is a forth-order filter, wherein $m$ and $n$ are equal to four.

Figure 4:
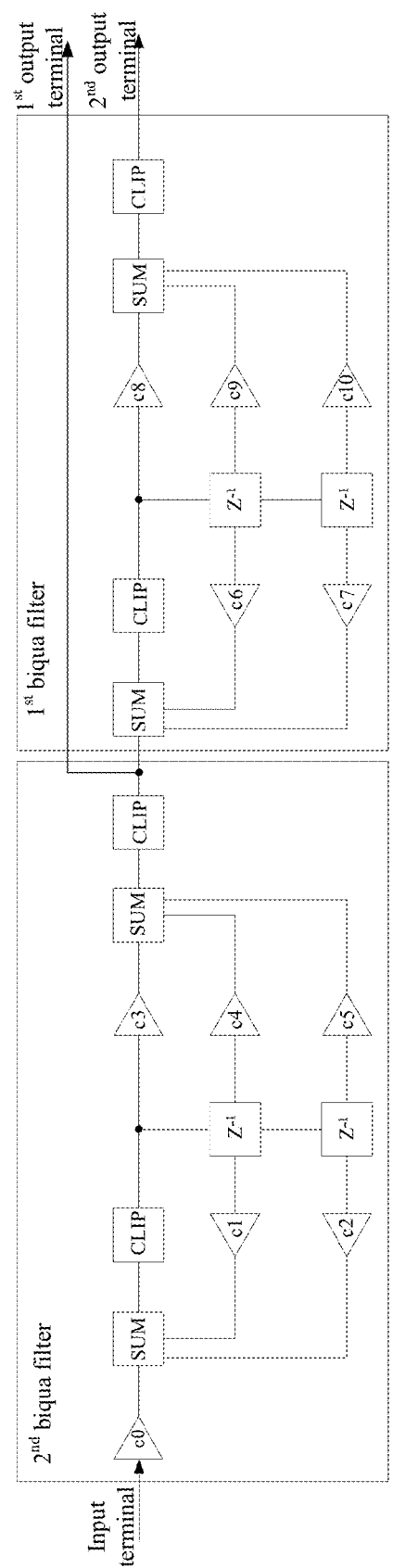
FIG. 4 schematically illustrates a structure of a filter unit according to one embodiment of the present disclosure.

Referring to FIG. 4, a dual biquad filter according to one embodiment of the present disclosure is illustrated, where the structure of the dual biquad filter is designed via MATLAB (Matrix Laboratory).

The dual biquad filter includes a signal sum module (SUM), a signal clip module (CLIP), a signal delay module ($Z^{-1}$), and an adjustable signal gain module (GAIN) which includes gain adjusting coefficients c0 to c10. The gain adjusting coefficients c0 to c10 are equivalent to the adjustable parameters $a_1$ to $a_{n+1}$ and $b_1$ to $b_{m+1}$. In other words, when the adjusting coefficients c0 to c10 are determined, the adjustable parameters $a_1$ to $a_{n+1}$, $b_1$ to $b_{m+1}$ can be determined accordingly. Or, when the adjustable parameters $a_1$ to $a_{n+1}$, $b_1$ to $b_{m+1}$ are determined, the adjusting coefficients c0 to c10 can be determined accordingly.

When MATLAB is used for designing the filter, performance design and parameter generation of the IIR filter may be supported by the design tool box of the filter. The pass-band frequency and the stop-band frequency may be changed by adjusting the adjusting coefficients c0 to c10. Specific design method of the adjusting coefficients c0 to c10 may refer to design methods commonly used by the MATLAB, which will not be described in detail herein.

Both the determination of the adjustable parameters $a_1$ to $a_n+_1$, $b_1$ to $b_{m+1}$ and the design of the adjusting coefficients c0 to c10 relate to a frequency respond condition of the original image. Further, the frequency respond condition of the original image relates to the imaging sensor, as the original image is generated based on light received by the imaging sensor. In the present disclosure, image data, recorded based on image signals obtained by the imaging sensor of the photographic equipment, is used to obtain the frequency respond condition of the original image data. Accordingly, filter parameters, based on which the frequency respond values in the focus control module 103 are obtained, are determined.

The original image recorded based on image signals obtained by the imaging sensor of the focus control module 103 may also referred to as a historical original image.

Filter parameters determined based on the historical original image mainly relate to the pass-band frequency and the stop-band frequency.

In fact, the pass-band frequency and the stop-band frequency are used to obtain a range of effective frequency band, where the effective frequency band is a measurement of focusing accuracy. Information of the effective frequency band of the pixels is helpful for reflecting focusing statistic. Further, through defining the effective frequency band, noise frequency band and other ineffective frequency bands are removed, thus focusing accuracy and efficiency are improved.

Figure 5:
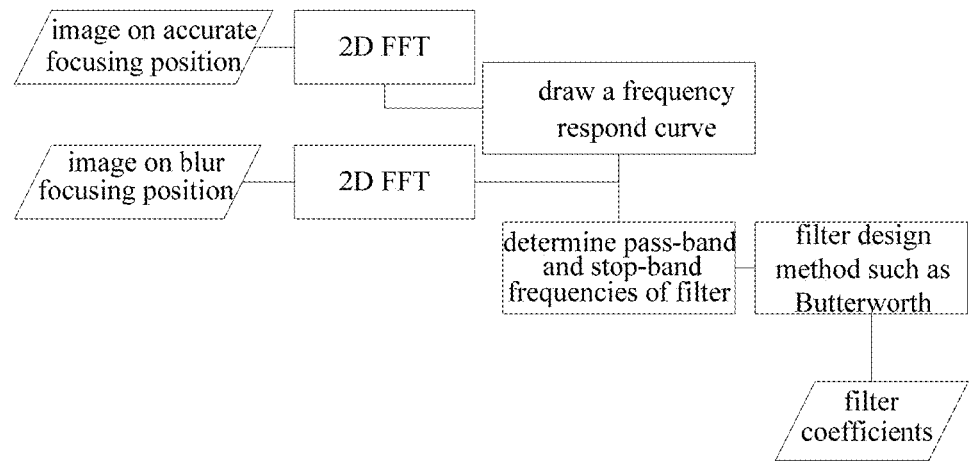
FIG. 5 schematically illustrates a process of obtaining a pass-band frequency and a stop-band frequency of a filter unit by utilization of a frequency response curve of historical original images according to one embodiment of the present disclosure.

In the present disclosure, when a frequency respond curve of the historical original images is used to obtain the pass-band frequency and the stop-band frequency of the filter unit, the historical original images include at least one image corresponding to an accurate focusing position (i.e. an image obtained when the lenses are in a determined accurate focusing position) and at least one image corresponding to an inaccurate focusing position (i.e. an image obtained when the lenses are in a determined inaccurate focusing position). In some embodiments of the present disclosure, as shown in FIG. 5, only two images are used to determine the pass-band frequency and the stop-band frequency of the filter unit, which is taken for exemplary illustration and but not limitation.

Specifically, the pass-band frequency and the stop-band frequency can be obtained by the following process: inputting image data (i.e. image signal, that is original image recorded by the photographic equipment, or historic original image) from the imaging sensor 22; determining a first image and a second image, wherein the first image is generated at an accurate focusing position, and the second image is generated at a blur focusing position; implementing a two-dimensional fast Fourier-transform to the first image and the second image respectively, so as to transform the first image and the second image into frequency domain; selecting data on a diagonal line of a matrix resulting from the two-dimensional fast Fourier-transform implemented to the first image and the second image, respectively, to obtain a frequency respond curve of the first image and a frequency respond curve of the second image, wherein the frequency respond curve of the first image and the frequency respond curve of the second image are drew together; analyzing differences between frequency responds of the first image and the second image based on the frequency respond curves, to determine the pass-band frequency and the stop-band frequency of the filter; and generating filter coefficients of required orders (e.g. adjustable parameter, adjust coefficients as recited above), wherein the filter coefficients may be generated by typical filter design method, such as Butterworth filter design method (which can be achieved by MATLAB tool box).

In some embodiments of the present disclosure, more than two images, or other types of image may be used to obtain the pass-band frequency and the stop-band frequency, where the images are adapted to reflect both image conditions at the accurate focusing position and at the blur focusing position. Specifically, when more than two images are used, the pass-band frequency and the stop-band frequency are obtained by: implementing a two-dimensional fast Fourier-transform to the images respectively, so as to transform the images into frequency domain; selecting data on a diagonal line of a matrix resulting from the two-dimensional fast Fourier-transform implemented to the images, respectively, to obtain frequency respond curves of the images, wherein the frequency respond curves of the images are drew together; analyzing differences between frequency responds of the images based on the frequency respond curves, to determine the pass-band frequency and the stop-band frequency of the filter; and generating filter coefficients of required orders, wherein the filter coefficients may be generated by typical filter design method.

In some embodiments of the present disclosure, the filter may be a band-pass filter or a high-pass filter.

In some embodiments of the present disclosure, the filter unit is achieved by an IIR filter in dual biqua filter form. With reference to FIG. 4, the filter unit includes two output terminals which are respectively a first output terminal of a first stage biqua filter and a second output terminal of a second stage biqua filter. In some embodiments, the second output terminal serves as an output terminal of the filter unit, which is used to output frequency respond values of the pixels. In some embodiments of the present disclosure, the first output terminal may serve as the output terminal of the filter unit, according to different filter functions used. In some embodiments of the present disclosure, the output terminal of the filter unit may switch between the first output terminal and the second output terminal, according to different parameters selected.

During the process of driving the focusing lens by the lens driving component 102, positions of the lens 101 varies.

In some embodiments of the present disclosure, the focus control module 103 takes a sum of the frequency values of the interested pixels as a final frequency respond result. In some embodiments of the present disclosure, the focus control module 103 takes a mean value of the frequency values of the interested pixels as a final frequency respond result. The frequency respond result of each original image is focus statistic information, and is used to evaluate the focusing performance. The focus statistic information (i.e. the frequency respond result of each original image) may be visually illustrated by a focusing statistic curve (FV curve).

Figure 6:
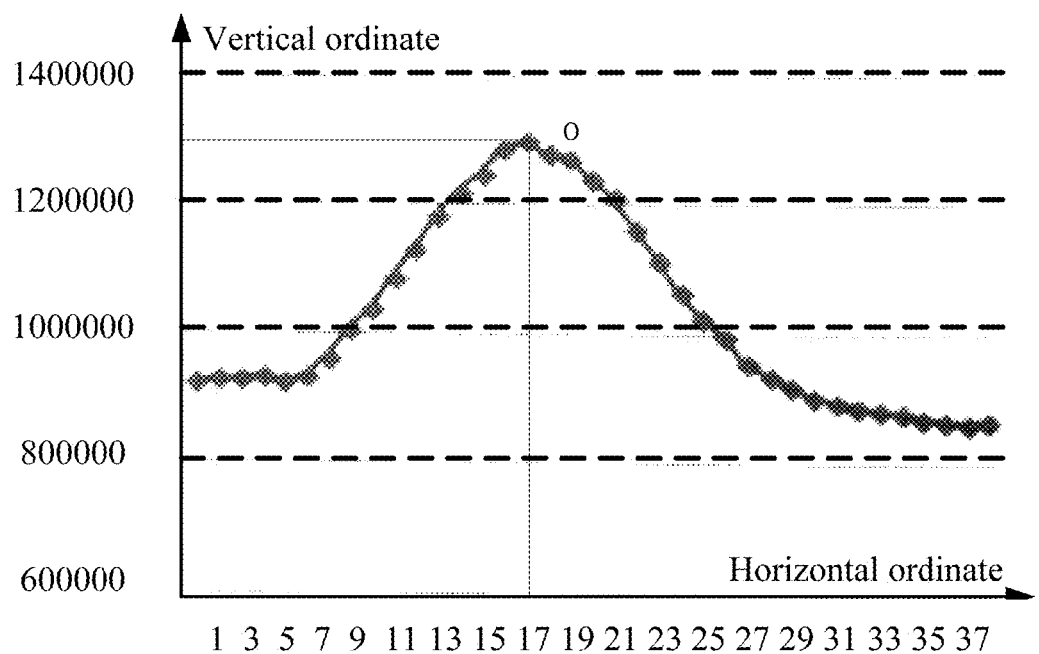
FIG. 6 schematically illustrates a statistical curve obtained during a focus process according to one embodiment of the present disclosure.

Referring to FIG. 6, a focusing statistic curve according to one embodiment of the present disclosure is illustrated. The horizontal ordinate represents position change (i.e. position change of the lens 101) in mm (millimeter). The vertical ordinate represents sum of frequency respond values of interested pixels in an original image generated at corresponding position of the lens 101, which is a scalar.

Based on the focusing statistic curve as shown in FIG. 6, a desired frequency respond result can be selected from frequency respond results corresponding to the original images. In some embodiments, the desired frequency respond result is the maximum value of the focusing statistic curve. Further, a first position of the lens 101 corresponding to the desired frequency respond result is taken as a focusing position. Thereafter, a focusing signal with information of the focusing position is sent to the lens driving component 102, thus driving the lens 101 to move to the focusing position for achieving the focusing process. For example, on the focusing statistic curve in FIG. 6, the value 17 mm on the horizontal ordinate corresponding to the point "o" is the focusing position.

In some embodiments, the focus control module 103 of the auto-focus apparatus is embodied as a filter unit. Specifically, band pass and high pass features of the filter unit are used to generate auto-focus statistic information directly. By such way, focus speed and focus accuracy of the auto-focus apparatus under low light level are both improved. Further, problems of hard to focus and long in focus time existed when the target object has weak feature are solved.

From the focusing statistic curve as shown in FIG. 6, it can be seen that the focusing statistic curve has good stability, and there is substantially no curve jitter. Further, the steepness of the curve is suitable for focusing the target object with weak feature, and obtaining the focusing position.

In some embodiments of the present disclosure, the filter coefficients (i.e. the adjustable parameters and the adjust coefficients) may be modified according to different imaging sensors and historical original images. Thus, the pass-band frequency of the filter unit can be selected flexibly, and focusing accuracy and adaptability of the auto-focus apparatus are improved.

It should be noted that, the lens driving component 102 may have a same structure with the lens driving component 12.

Figure 7:
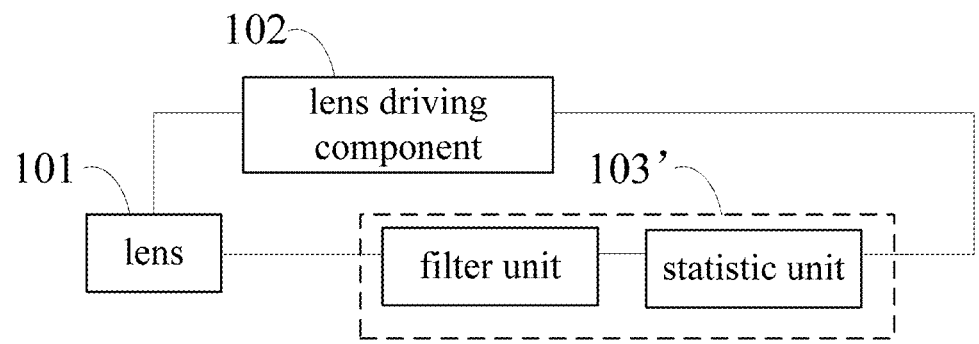
FIG. 7 schematically illustrates a structure of an auto-focus apparatus according to another embodiment of the present disclosure.

Referring to FIG. 7, an auto-focus apparatus a2 according to one embodiment of the present disclosure is illustrated. The auto-focus apparatus a2 is different from the auto-focus apparatus a1 in that: a focus control module 103' of the auto-focus apparatus a2 includes a statistic unit. The statistic unit is configured to: output a frequency respond result based on frequency respond values of interested pixels in the corresponding original image.

In some embodiments of the present disclosure, the statistic unit is configured to establish a correlation between frequency respond results and frequency respond values of the interested pixels, wherein the correlation is a one to one relation. The correlation may vary. For example, the frequency respond result may be a sum or a mean value of the frequency respond values as recited in the above mentioned embodiment.

In some embodiments of the present disclosure, regarding one focusing process, the frequency respond result is output in form of a focusing statistic curve as recited in the above mentioned embodiment.

Figure 8:
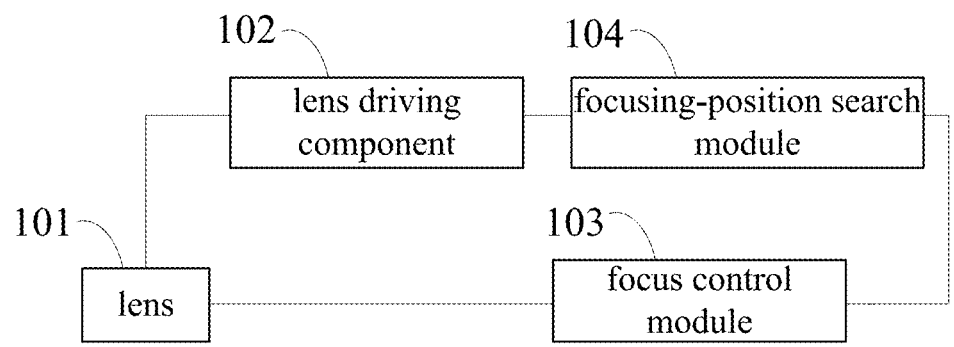
FIG. 8 schematically illustrates a structure of an auto-focus apparatus according to another embodiment of the present disclosure.

Referring to FIG. 8, an auto-focus apparatus a3 according to one embodiment of the present disclosure is illustrated. The auto-focus apparatus a3 is different from the auto-focus apparatus a1 in that: the auto-focus apparatus a3 includes a focusing-position search module 104.

The focusing-position search module 104 is configured to: constantly obtain frequency respond results output from the focus control module 103 during a process of the lens driving module 102 driving the lens 101 to multiple positions; establish a correlation between frequency respond results and the positions of the lens based on the frequency respond results and the corresponding positions of the lens obtained during the lens is driven to move; and identify the desired frequency respond result based on the correlation.

For example, if the focusing statistic curve is as shown in FIG. 6, the focusing-position search module 104 identifying the desired frequency respond result refers to: calculating a maximum value of the focusing statistic curve. Thereafter, a focusing-position corresponding to the maximum value is output, thus sending a signal corresponding to the focusing-position to the lens driving component 102. Accordingly, the lens 101 will be driven by the lens driving component 102 to the focusing-position.

In some embodiments of the present disclosure, the focusing-position search module 104 is integrated in the focus control module 103.

Figure 9:
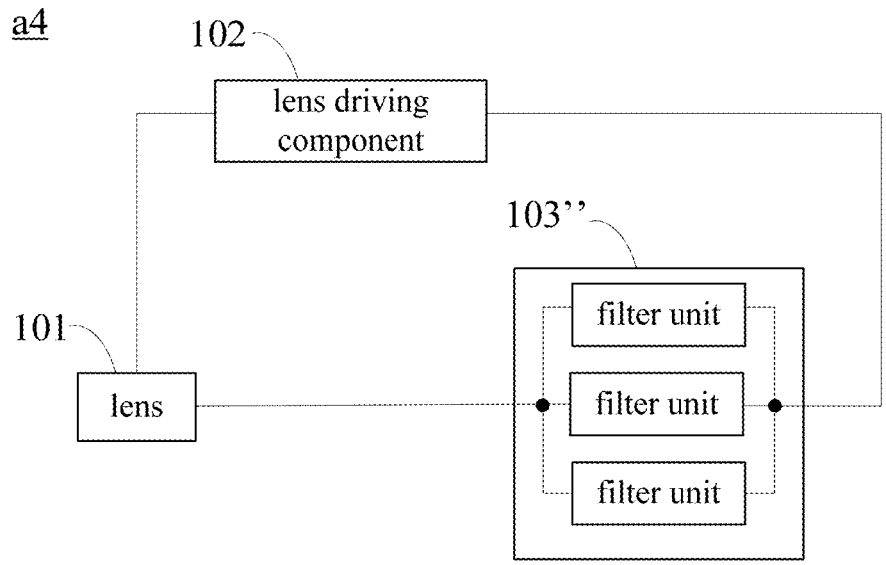
FIG. 9 schematically illustrates a structure of an auto-focus apparatus according to another embodiment of the present disclosure.

Referring to FIG. 9, an auto-focus apparatus a4 according to one embodiment of the present disclosure is illustrated. The auto-focus apparatus a4 is different from the auto-focus apparatus a1 in that: image data of the interested pixels in the original images are parallel processed, wherein the image data of the interested pixels are collected in form of focus texting box. Supposing the focus texting box collects n·m (i.e. n rows by m columns form) interested pixels of the original image, where n and m are natural number greater than or equal to 1. In some embodiments, the focus control module of the auto-focus apparatus may configured with n filter units for processing the m interested pixels on each column of the focus texting box, respectively. In some embodiments, the focus control module of the auto-focus apparatus may be configured with m filter units for processing the n interested pixels on each row of the focus texting box, respectively. As shown in FIG. 9, the focus texting box is configured to collect 3·3 (3 rows by 3 columns) pixels in the original image. Accordingly, the focus control module of the auto-focus apparatus is configured to three filter units which are adapted to calculate frequency respond values of the three rows of pixels respectively. Each filter unit is configured to one row of pixels. Outputs of each filter unit are put together, so as to output the frequency respond result.

Figure 10:
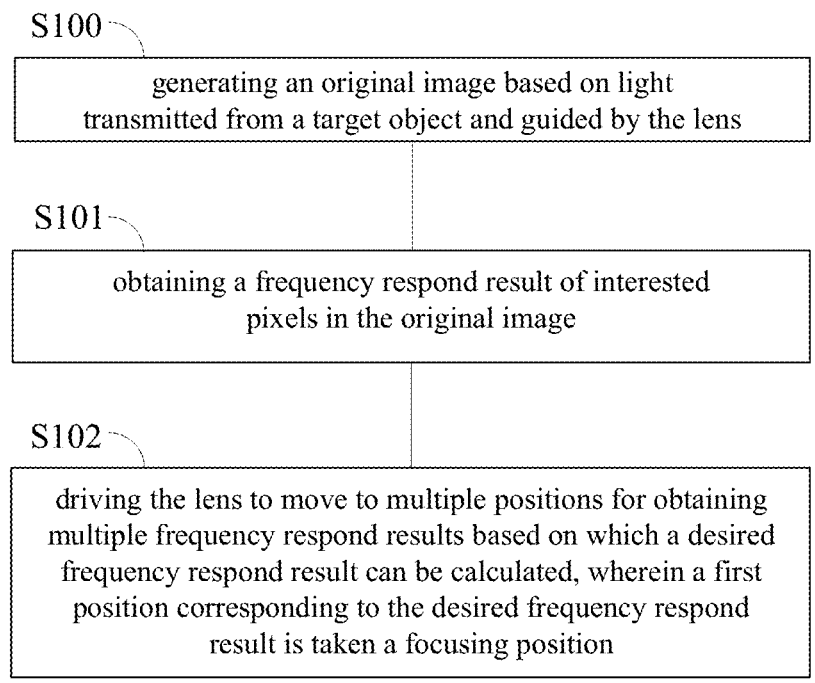
FIG. 10 schematically illustrates a flow chart of an auto-focus method according to one embodiment of the present disclosure.

Referring to FIG. 10, an auto-focus method according to one embodiment of the present disclosure is illustrated. The auto-focus method includes following steps from step S100 to step S102.

In step S100, generating an original image based on light transmitted from a target object and guided by a lens.

In step S101, obtaining a frequency respond result of interested pixels in the original image.

In step S102, driving the lens to move to multiple positions, thus obtaining multiple frequency respond results based on which a desired frequency respond result can be calculated, and a first position of the lens corresponding to the desired frequency respond result serves as a focusing position, whereby the lens is driven to the focusing-position for achieving auto-focusing.

Accordingly, in the auto-focus method provided by the present disclosure, the lens is driven to move to multiple positions, thus multiple original images, each of which is generated based on light transmitted from a target object and guided by the lens at a corresponding position, are obtained. Then, based on the multiple original images, the frequency respond result corresponding to interested pixels in each of the original images can be obtained. Thereafter, through calculating a desired frequency respond result based on the obtained frequency respond results, a first position of the lens corresponding to the desired frequency respond result is obtained, and the first position is taken as a focusing position. Thus, auto focusing can be realized by driving the lens to the focusing position.

Moreover, step S101 may be implemented by any of the ways as aforementioned relating to the focus control module. In step S102, the implementing of driving the lens and obtaining the frequency respond results can refer to disclosure aforementioned, which will not be described in detail herein.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. An auto-focus apparatus, comprising: a lens, a lens driving component, and a focus control module;
   wherein the lens is configured to guide light transmitted from a target object, where original images are formed based on the light guided by the lens at multiple positions, respectively;
   wherein the lens driving component is configured to drive the lens to move to the multiple positions to obtain the original images;
   wherein the focus control module comprises a filter unit configured to obtain frequency respond results each of which corresponds to a portion of all pixels in one of the original images based on frequency respond values of the portion of all pixels in the corresponding original image, and the focus control module is further configured to calculate a desired frequency respond result based on the obtained frequency respond results; and the filter unit is a band-pass filter or a high-pass filter;
   wherein the filter unit is configured to obtain the frequency respond values of the portion of all pixels according to Equation (1):

$$H(z) = \frac{b_1 + b_2 z^{-1} + \ldots + b_{m+1} z^{-m}}{a_1 + a_2 z^{-1} + \ldots + a_{n+1} z^{-n}}, \quad \text{Equation (1)}$$

wherein H(z) represents the frequency respond value of one of pixels in the portion of all pixels, z represents image data of the corresponding portion of all pixels, m and n represent order numbers of the filter unit, $a_1$ to $a_{n+1}$ and $b_1$ to $b_{m+1}$ represent adjustable parameters of the filter unit and are determined based on historical original images previously obtained; and
   wherein the lens driving component is further configured to drive the lens to a focusing position, where the focusing position is a first position of the lens corresponding to the desired frequency respond result.

2. The auto-focus apparatus according to claim 1, wherein the frequency respond result is a sum of the frequency respond values of the portion of all pixels in the corresponding original image.

3. The auto-focus apparatus according to claim 1, wherein the frequency respond result is a mean value of the frequency respond values of the portion of all pixels in the corresponding original image.

4. The auto-focus apparatus according to claim 1, wherein the filter unit is a forth-order filter.

5. The auto-focus apparatus according to claim 1, wherein the adjustable parameters are determined, via a computing device installed with MATLAB (Matrix Laboratory), based on frequency respond curves generated based on the historical original images, and the historical original images include at least an image corresponding to an accurate focusing position and an image corresponding to an inaccurate focusing position.

6. The auto-focus apparatus according to claim 5, wherein the adjustable parameters are determined, via a computing device installed with MATLAB (Matrix Laboratory), by: determining a pass-band frequency and a stop-band frequency of the filter unit based on the frequency respond curves, and generating the adjustable parameters based on the pass-band frequency and the stop-band frequency.

7. The auto-focus apparatus according to claim 1, further comprising an image sensing module; wherein the image sensing module is configured to: receive the light transmitted from the target object and guided by the lens at one of the multiple positions, and generate an image signal based on the light received, where the original image at the corresponding position is generated based on the image signal.

8. The auto-focus apparatus according to claim 7, wherein the image sensing module is a C-MOS sensor which also serves as a photographic component.

9. An auto-focus method for a piece of photographic equipment with a lens, comprising:
   driving the lens to move to multiple positions to obtain multiple original images, where the original image is generated based on light transmitted from a target object and guided by the lens at the corresponding position;
   obtaining frequency respond results, where each of the frequency results corresponds to a portion of all pixels in one of the original images;
   calculating a desired frequency respond result based on the obtained frequency respond results through a filter unit and taking a first position of the lens corresponding to the desired frequency respond result as a focusing position and the filter unit is a band-pass filter or a high-pass filter; and
   driving the lens to the focusing position;
   wherein the frequency respond result is obtained based on frequency respond values of the portion of all pixels in the corresponding original image, and
   wherein obtaining the frequency respond result based on the frequency respond values of the portion of all pixels comprises: obtaining the frequency respond value according to Equation (1):

$$H(z) = \frac{b_1 + b_2 z^{-1} + \ldots + b_{m+1} z^{-m}}{a_1 + a_2 z^{-1} + \ldots + a_{n+1} z^{-n}}, \quad \text{Equation (1)}$$

wherein H(z) represents the frequency respond value of one of the portion of all pixels, z represents image data of the corresponding portion of all pixels, m and n represent order numbers of the filter unit, $a_1$ to $a_{n+1}$ and $b_1$ to $b_{m+1}$ represent adjustable parameters of the filter unit and relate to historical original images previously obtained.

10. The auto-focus method according to claim 9, wherein the frequency respond result is a sum of the frequency respond values of the portion of all in the corresponding original image.

11. The auto-focus method according to claim 9, wherein the frequency respond result is a mean value of the frequency respond values of the portion of all pixels in the corresponding original image.

12. The auto-focus method according to claim 9, the adjustable parameters are determined based on frequency respond curves generated based on the historical original images, the historical original images comprise at least an image corresponding to an accurate focusing position and an image corresponding to an inaccurate focusing position; and wherein the adjustable parameters are generated based on a pass-band frequency and a stop-band frequency of the filter unit which are generated according to the frequency respond curves.

13. The auto-focus method according to claim 9, wherein calculating the desired frequency respond result based on the obtained frequency respond results comprises:
    establishing a correlation between frequency respond results and lens positions based on the frequency respond results and the corresponding positions of the lens obtained during the lens is driven to move; and
    identifying the desired frequency respond result based on the correlation.

\* \* \* \* \*